United States Patent
Mohen et al.

(10) Patent No.: US 10,785,310 B1
(45) Date of Patent: Sep. 22, 2020

(54) METHOD AND SYSTEM IMPLEMENTING DYNAMIC AND/OR ADAPTIVE USER INTERFACES

(71) Applicant: Open Text Corporation, Waterloo (CA)

(72) Inventors: Michael T. Mohen, Millington, MD (US); Raman Walia, Bangalore (IN); Sreecharan Shroff, Bangalore (IN); Shanmugasundaram Ks, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 239 days.

(21) Appl. No.: 14/871,288

(22) Filed: Sep. 30, 2015

(51) Int. Cl.
*H04L 29/08* (2006.01)
*G06F 3/0482* (2013.01)
*G06F 3/0484* (2013.01)

(52) U.S. Cl.
CPC .......... *H04L 67/141* (2013.01); *G06F 3/0482* (2013.01); *G06F 3/04842* (2013.01); *H04L 67/02* (2013.01); *H04L 67/10* (2013.01)

(58) Field of Classification Search
CPC ....... H04L 67/141; H04L 67/02; H04L 67/10; G06F 3/0482; G06F 3/04842
See application file for complete search history.

(56) References Cited

U.S. PATENT DOCUMENTS

| | | | | |
|---|---|---|---|---|
| 5,751,271 A | * | 5/1998 | Anstotz | G06F 21/62 715/745 |
| 5,761,662 A | * | 6/1998 | Dasan | G06F 17/30067 |
| 5,796,952 A | * | 8/1998 | Davis | G06F 16/9535 709/224 |
| 5,832,298 A | * | 11/1998 | Sanchez | H04N 1/00204 370/252 |
| 6,199,067 B1 | * | 3/2001 | Geller | G06F 17/30702 |
| 6,683,600 B1 | * | 1/2004 | Lui | G06F 3/04883 345/179 |
| 7,136,710 B1 | * | 11/2006 | Hoffberg | G06F 3/00 382/155 |
| 7,242,988 B1 | * | 7/2007 | Hoffberg | G05B 19/0426 348/E5.102 |
| 7,583,861 B2 | * | 9/2009 | Hanna | G06F 19/321 382/305 |
| 7,818,020 B1 | * | 10/2010 | Manroa | H04L 29/1216 455/3.01 |
| 7,937,348 B2 | * | 5/2011 | Shaw | H04L 67/306 706/45 |
| 7,974,714 B2 | * | 7/2011 | Hoffberg | G06K 9/00369 360/75 |
| 8,082,511 B2 | * | 12/2011 | Sobotka | G06F 3/0482 715/745 |

(Continued)

*Primary Examiner* — Jung-Mu T Chuang
(74) *Attorney, Agent, or Firm* — Sprinkle IP Law Group

(57) ABSTRACT

A method and system for servicing requests, including a deployed application that receives a request from a requesting entity, where the request is associated with a user. The system further includes determining a user interface (UI) event associated with the request, creating and storing a UI event entry based on the UI event, obtaining the application UI interaction profile (AUIP) associated with the user, obtaining a modified UI screen, where at least a portion of a default UI screen is modified based, at least in part on the AUIP, and providing the modified UI screen to the requesting entity.

21 Claims, 11 Drawing Sheets

(56) References Cited

U.S. PATENT DOCUMENTS

| | | | | |
|---|---|---|---|---|
| 8,165,916 B2* | 4/2012 | Hoffberg | G05B 15/02 | 705/14.53 |
| 8,182,270 B2* | 5/2012 | Elzinga | G09B 7/00 | 434/322 |
| 8,208,905 B2* | 6/2012 | Lee | G06F 17/30867 | 455/403 |
| 8,499,250 B2* | 7/2013 | Wetzer | G06F 9/54 | 345/158 |
| 8,667,156 B2* | 3/2014 | Soliman | H04L 41/12 | 709/230 |
| 8,676,937 B2* | 3/2014 | Rapaport | H04L 51/32 | 709/219 |
| 8,751,639 B2* | 6/2014 | Griffiths | G06F 17/30194 | 709/224 |
| 8,799,808 B2* | 8/2014 | Satterfield | G06F 17/211 | 715/752 |
| 9,229,905 B1* | 1/2016 | Penilla | G06F 17/00 | |
| 9,305,160 B2* | 4/2016 | Adler | H04L 63/083 | |
| 9,319,522 B1* | 4/2016 | Webster | H04M 3/493 | |
| 9,372,675 B1* | 6/2016 | Pescosolido | G06F 3/048 | |
| 9,405,427 B2* | 8/2016 | Curtis | G06F 3/0481 | |
| 9,513,931 B2* | 12/2016 | Sauer | G06F 9/4443 | |
| 9,519,425 B1* | 12/2016 | Wood | G06F 3/0601 | |
| 9,524,092 B2* | 12/2016 | Ren | G06F 1/32 | |
| 9,579,790 B2* | 2/2017 | Laurent | | |
| 9,641,632 B1* | 5/2017 | Torrance | H04L 67/22 | |
| 9,652,777 B2* | 5/2017 | Tapley | G06F 3/0481 | |
| 9,672,232 B1* | 6/2017 | Auerbach | G06F 17/30864 | |
| 9,715,395 B2* | 7/2017 | Kureshy | G06F 3/04895 | |
| 9,766,862 B2* | 9/2017 | De Freitas | G06F 8/38 | |
| 9,817,804 B2* | 11/2017 | Goldstein | G06F 17/2288 | |
| 9,868,056 B2* | 1/2018 | Kehoe | A63F 13/23 | |
| 9,898,534 B2* | 2/2018 | Liesche | H04L 67/22 | |
| 10,026,067 B2* | 7/2018 | Bianchi | G06F 16/11 | |
| 10,372,285 B2* | 8/2019 | Ramadge | G06F 3/0481 | |
| 2002/0138577 A1* | 9/2002 | Teng | G06F 21/41 | 709/205 |
| 2002/0156879 A1* | 10/2002 | Delany | H04L 43/00 | 709/223 |
| 2002/0158910 A1* | 10/2002 | Sharrow | G05B 19/0426 | 715/810 |
| 2003/0135384 A1* | 7/2003 | Nguyen | G06Q 10/10 | 705/301 |
| 2003/0151621 A1* | 8/2003 | McEvilly | H04N 7/17318 | 715/744 |
| 2003/0217034 A1* | 11/2003 | Shutt | G06Q 10/10 | |
| 2004/0006592 A1* | 1/2004 | Chang | H04L 29/06 | 709/203 |
| 2005/0005235 A1* | 1/2005 | Satterfield | G06F 17/211 | 715/245 |
| 2005/0143138 A1* | 6/2005 | Lee | G06F 3/011 | 455/566 |
| 2006/0010470 A1* | 1/2006 | Kurosaki | H04H 20/76 | 725/46 |
| 2006/0122917 A1* | 6/2006 | Lokuge | G06F 17/30861 | 705/27.1 |
| 2006/0179042 A1* | 8/2006 | Bram | G06N 5/043 | |
| 2006/0179058 A1* | 8/2006 | Bram | G06F 21/121 | |
| 2006/0218506 A1* | 9/2006 | Srenger | G06F 9/4446 | 715/810 |
| 2007/0016476 A1* | 1/2007 | Hoffberg | G05B 15/02 | 705/14.64 |
| 2007/0053513 A1* | 3/2007 | Hoffberg | G06K 9/00369 | 380/201 |
| 2007/0130523 A1* | 6/2007 | Ku | G06F 9/4443 | 715/746 |
| 2007/0240079 A1* | 10/2007 | Flynt | H04M 1/72522 | 715/810 |
| 2007/0300185 A1* | 12/2007 | Macbeth | G06F 9/451 | 715/825 |
| 2008/0005793 A1* | 1/2008 | Wenig | G06F 11/3438 | 726/22 |
| 2008/0189628 A1* | 8/2008 | Liesche | H04L 67/22 | 715/762 |
| 2008/0256128 A1* | 10/2008 | Pierce | G16H 10/20 | |
| 2008/0275995 A1* | 11/2008 | Soliman | H04L 41/12 | 709/230 |
| 2008/0276186 A1* | 11/2008 | Feduszczak | G06F 9/451 | 715/762 |
| 2008/0293375 A1* | 11/2008 | Swanburg | H04M 11/002 | 455/405 |
| 2008/0295076 A1* | 11/2008 | McKain | G06F 9/4443 | 717/124 |
| 2009/0164923 A1* | 6/2009 | Ovi | G06F 3/04817 | 715/764 |
| 2009/0265646 A1* | 10/2009 | Cho | G06F 9/4445 | 715/762 |
| 2009/0276407 A1* | 11/2009 | Van Vleet | G06Q 30/02 | |
| 2009/0282107 A1* | 11/2009 | O'Sullivan | G06Q 10/00 | 709/206 |
| 2009/0307692 A1* | 12/2009 | Do | G06F 9/485 | 718/100 |
| 2009/0307693 A1* | 12/2009 | Do | G06F 9/4843 | 718/100 |
| 2010/0131482 A1* | 5/2010 | Linthicum | G06F 19/00 | 707/706 |
| 2010/0281268 A1* | 11/2010 | Barreto | H04W 4/21 | 713/182 |
| 2010/0295797 A1* | 11/2010 | Nicholson | G06F 1/1626 | 345/173 |
| 2011/0015996 A1* | 1/2011 | Kassoway | G06F 17/30882 | 705/14.49 |
| 2011/0153612 A1* | 6/2011 | Paul | G06F 17/30905 | 707/740 |
| 2011/0173638 A1* | 7/2011 | Nakamae | G06Q 10/10 | 719/318 |
| 2011/0214067 A1* | 9/2011 | Tanaka | G06F 3/0481 | 715/745 |
| 2011/0252160 A1* | 10/2011 | Wu | G06F 17/227 | 709/246 |
| 2011/0252314 A1* | 10/2011 | Barker | G06F 21/6227 | 715/255 |
| 2011/0304550 A1* | 12/2011 | Romera Jolliff | G06F 3/016 | 345/168 |
| 2012/0042263 A1* | 2/2012 | Rapaport | G06Q 50/01 | 715/753 |
| 2012/0069131 A1* | 3/2012 | Abelow | G06Q 10/067 | 348/14.01 |
| 2012/0110450 A1* | 5/2012 | Kureshy | G06F 3/04895 | 715/708 |
| 2012/0233103 A1* | 9/2012 | Ashrafi | G06F 8/71 | 706/16 |
| 2012/0290950 A1* | 11/2012 | Rapaport | H04L 51/32 | 715/753 |
| 2013/0044128 A1* | 2/2013 | Liu | G09G 5/00 | 345/633 |
| 2013/0086496 A1* | 4/2013 | Baram | G06F 17/24 | 715/762 |
| 2013/0205215 A1* | 8/2013 | Dunn | H04L 41/22 | 715/738 |
| 2013/0212487 A1* | 8/2013 | Cote | G06F 3/048 | 715/745 |
| 2013/0212703 A1* | 8/2013 | Ramesh | G06F 21/6218 | 726/28 |
| 2014/0032311 A1* | 1/2014 | Cramer | G06Q 30/0256 | 705/14.45 |
| 2014/0047328 A1* | 2/2014 | Ruble | G06T 15/10 | 715/256 |
| 2014/0082473 A1* | 3/2014 | Sitrick | G06F 17/24 | 715/230 |
| 2014/0143694 A1* | 5/2014 | Tapley | G06F 3/0481 | 715/765 |
| 2014/0149583 A1* | 5/2014 | Gil | G06Q 50/01 | 709/224 |
| 2014/0215343 A1* | 7/2014 | Ligman | H04L 67/22 | 715/736 |
| 2014/0250425 A1* | 9/2014 | Kumar | G06F 11/3072 | 717/121 |

(56) References Cited

U.S. PATENT DOCUMENTS

| | | | |
|---|---|---|---|
| 2014/0257935 A1* | 9/2014 | Killoh | G06Q 30/0276 705/7.35 |
| 2014/0297353 A1* | 10/2014 | Srivastava | G06Q 10/06316 705/7.26 |
| 2014/0304128 A1* | 10/2014 | Cornet | G06Q 40/125 705/32 |
| 2014/0310193 A1* | 10/2014 | Olliphant | G06Q 20/10 705/329 |
| 2014/0337346 A1* | 11/2014 | Barthel | G06F 17/30899 707/738 |
| 2014/0365907 A1* | 12/2014 | De Freitas | G06F 8/38 715/746 |
| 2015/0025960 A1* | 1/2015 | Gadamsetty | G06Q 50/01 705/14.44 |
| 2015/0039560 A1* | 2/2015 | Barker | G06F 16/93 707/626 |
| 2015/0082164 A1* | 3/2015 | Chana | G06F 9/4446 715/705 |
| 2015/0134645 A1* | 5/2015 | Adari | G06F 16/957 707/722 |
| 2015/0154164 A1* | 6/2015 | Goldstein | G06F 17/2288 715/229 |
| 2015/0161200 A1* | 6/2015 | Barba | G06F 17/30386 705/313 |
| 2015/0220619 A1* | 8/2015 | Gray | G06F 17/30598 707/738 |
| 2015/0301926 A1* | 10/2015 | Giannelos | G06F 11/3676 717/125 |
| 2015/0302303 A1* | 10/2015 | Hakim | G06Q 10/063 706/11 |
| 2015/0326455 A1* | 11/2015 | Hui | G06F 3/0481 715/736 |
| 2015/0326522 A1* | 11/2015 | Pu | G06F 21/6245 726/26 |
| 2015/0346987 A1* | 12/2015 | Ren | G06F 1/32 345/589 |
| 2015/0350354 A1* | 12/2015 | Ji | H04L 67/22 715/205 |
| 2016/0041535 A1* | 2/2016 | Leonardi | G05B 13/04 700/29 |
| 2016/0041699 A1* | 2/2016 | Walsh | G06F 3/04883 715/763 |
| 2016/0057151 A1* | 2/2016 | Brock | G06F 16/955 726/4 |
| 2016/0072900 A1* | 3/2016 | Rahman | G01S 19/38 709/213 |
| 2016/0075015 A1* | 3/2016 | Izhikevich | B25J 9/163 700/253 |
| 2016/0075016 A1* | 3/2016 | Laurent | B25J 9/006 700/47 |
| 2016/0075017 A1* | 3/2016 | Laurent | B25J 9/163 700/264 |
| 2016/0075034 A1* | 3/2016 | Laurent | H04L 12/282 700/264 |
| 2016/0082348 A1* | 3/2016 | Kehoe | G06Q 10/101 463/31 |
| 2016/0087853 A1* | 3/2016 | McCoy | H04L 67/025 715/736 |
| 2016/0092935 A1* | 3/2016 | Bradley | G06Q 30/0276 705/14.72 |
| 2016/0103483 A1* | 4/2016 | Raffle | G06F 3/011 345/156 |
| 2016/0203304 A1* | 7/2016 | Bielstein | G06F 3/048 715/741 |
| 2016/0239814 A1* | 8/2016 | Bianchi | G06F 16/11 |
| 2016/0283726 A1* | 9/2016 | Steiner | G06F 21/604 |
| 2016/0306502 A1* | 10/2016 | Ramadge | G06F 3/04847 |
| 2016/0321034 A1* | 11/2016 | Yen | G06F 8/20 |
| 2016/0328787 A1* | 11/2016 | Szulczewski | G06Q 30/0201 |
| 2016/0358065 A1* | 12/2016 | Gedge | G06N 3/006 |
| 2017/0041296 A1* | 2/2017 | Ford | H04L 63/0421 |
| 2017/0116552 A1* | 4/2017 | Deodhar | G06Q 10/06316 |
| 2017/0192983 A1* | 7/2017 | Weng | G06F 17/3089 |
| 2017/0230412 A1* | 8/2017 | Thomas | H04L 63/1441 |
| 2017/0249071 A1* | 8/2017 | Tapley | G06F 3/0481 |
| 2017/0372401 A1* | 12/2017 | Wang | G06Q 30/0631 |

* cited by examiner

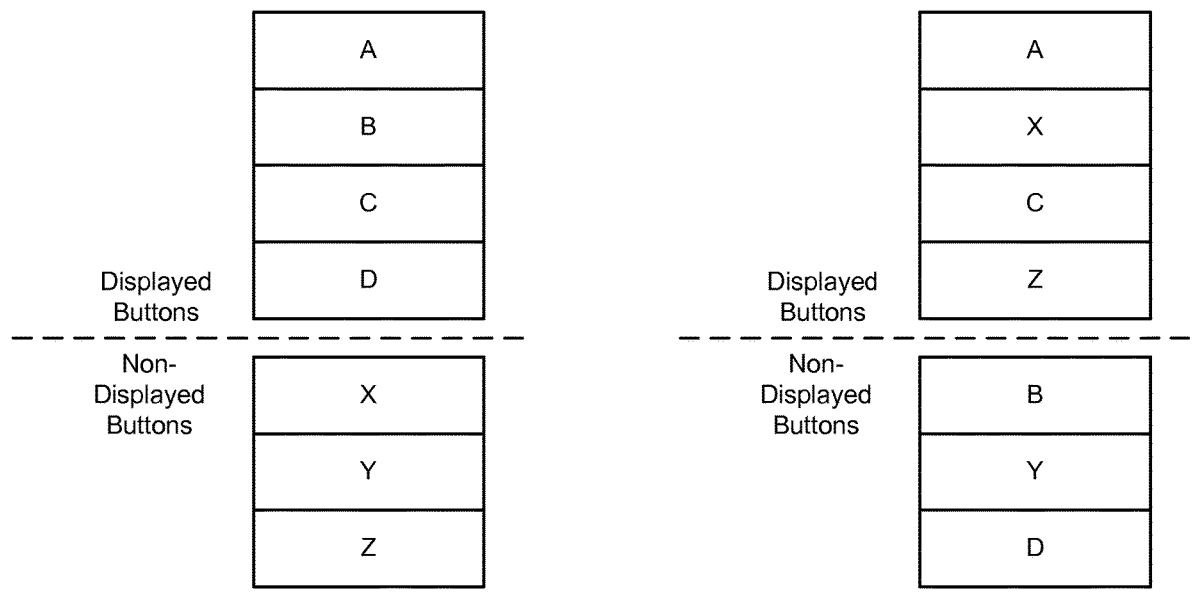
FIG. 5A
FIG. 5B
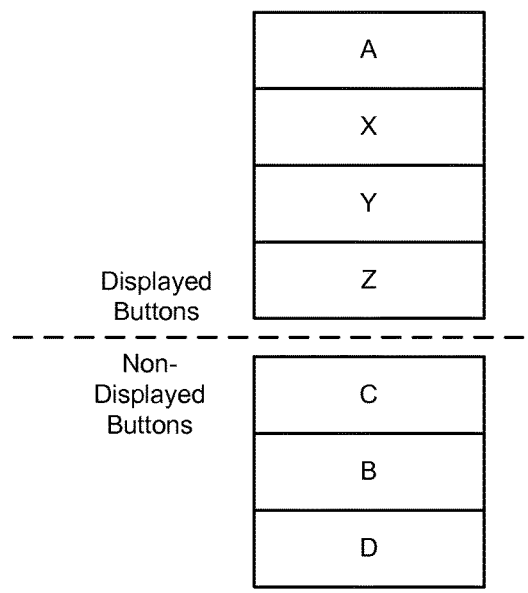
FIG. 5C

METHOD AND SYSTEM IMPLEMENTING DYNAMIC AND/OR ADAPTIVE USER INTERFACES

BACKGROUND

Applications implement user interfaces to enable users to interact with various features of the application. These user interfaces are traditionally static in nature and are difficult to customize.

BRIEF DESCRIPTION OF DRAWINGS

FIGS. 5A, 5B, and 5C show an example of dynamically modifying UI components in accordance with one or more embodiments of the disclosed technology.

DETAILED DESCRIPTION

Specific embodiments of the disclosed technology will now be described in detail with reference to the accompanying figures. In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description In the following description of FIGS. 1-8, any component described with regard to a figure, in various embodiments of the disclosed technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components.

Additionally, in accordance with various embodiments of the disclosed technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system for implementing dynamic and/or adaptive user interfaces in an application. More specifically, embodiments of the technology monitor how a user(s) interacts with the user interface of a given application and then modifies the user interface in order to improve the user's use of the application. Modification of the user interface may include, for example, changing the layout of a menu, the layout of the user interface components on a user interface, adding new user interface components to the user interface, and/or modifying content provided by various user interface components in the user interface.

Figure 1:
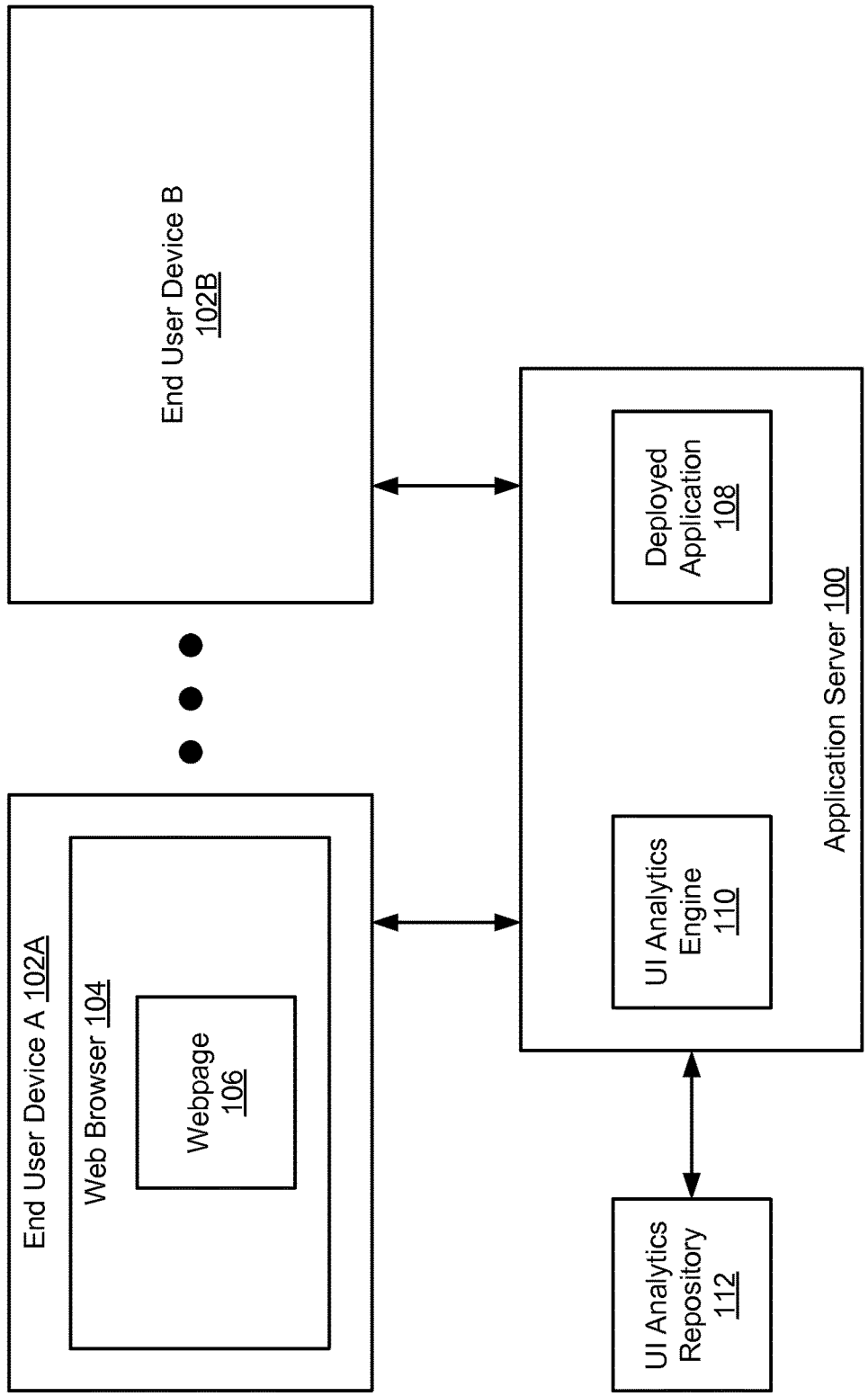
FIG. 1 shows an example system in accordance with one or more embodiments of the disclosed technology.

FIG. 1 shows an example system in accordance with one or more embodiments of the disclosed technology. The system includes an application server (100), one or more end user devices (102A, 102B), and a user interface (UI) analytics repository. Each of these components is described below.

In one embodiment of the technology, an application server (100) is a computing system (e.g., a computing system described in FIG. 8) that includes functionality to host a deployed application (also referred to as a deployed web application (108)). Hosting the deployed web application may include storing the necessary files including source code, images, third party libraries, etc. and then executing the deployed web application. Executing the deployed web application may include receiving HTTP requests from an end user device (102A, 102B), processing the HTTP requests, generating HTTP responses based on the processing of the HTTP requests, and providing the HTTP responses to the end user device. The application server (100) may also include functionality to perform all or portion of the steps shown in FIGS. 3 and 4.

Continuing with the discussion of FIG. 1, the term "web application" is used herein to generically refer to the web application executable, the web application design, or another form of the web application. Web applications include webpages. A webpage (106) is an output of the web application that is displayed on a web browser (104). In one embodiment of the technology, a webpage (106) may be considered a UI screen (see FIG. 2).

In one embodiment of the technology, the application server (100) may communicate (e.g., send and receive HTTP requests) with one or more end user devices (e.g., the computing systems in FIG. 8) over any wired network, wireless network, or other network that includes any combination of wired networks or wireless networks.

In one embodiment of the technology, the end user devices (102A, 102B) each include at least one web browser (104) that permits the end user device to display webpages (106) (provided with HTTP responses) to the end users. An end user is an individual or group of individuals that uses the web application via the end user device once the web application is deployed.

In one embodiment of the technology, the application server (102) also implements (or executes) a UI analytics engine (110). The UI analytics engine (110) may include functionality to: (i) create and store UI event entries in the UI analytics repository (112); (ii) analyze the UI event entries in the UI analytics repository (112) in order to generate an application UI action profile (AUIP) (see FIG. 2); and (iii) modify one or more UI screens in an application based on the AUIP (see FIG. 4-7C).

In one embodiment of the technology, the UI analytics repository (112) includes persistent storage (e.g., solid state storage, magnetic storage, optical storage, any other type of persistent storage or any combination thereof) in which the UI event entries are stored. The UI analytics repository may store UI event entries using any known or subsequently discovered mechanism. The following describes various examples of the mechanisms that may be used to store UI event entries. The examples are not intended to limit the technology. In a first example, the UI analytics repository may be a set of magnetic hard disks. In a second example, the UI analytics repository may be implemented using a computer cluster that is executing a distributed file system. In a third example, the UI analytics repository may be implemented using a network file server and one or more block-storage devices (i.e., as a Storage Area Network).

While FIG. 1 shows a configuration of components, other configurations may be used without departing from the scope of the technology. For example, various components may be combined to create a single component. As another example, the functionality performed by a single component may be performed by two or more components.

Figure 2:
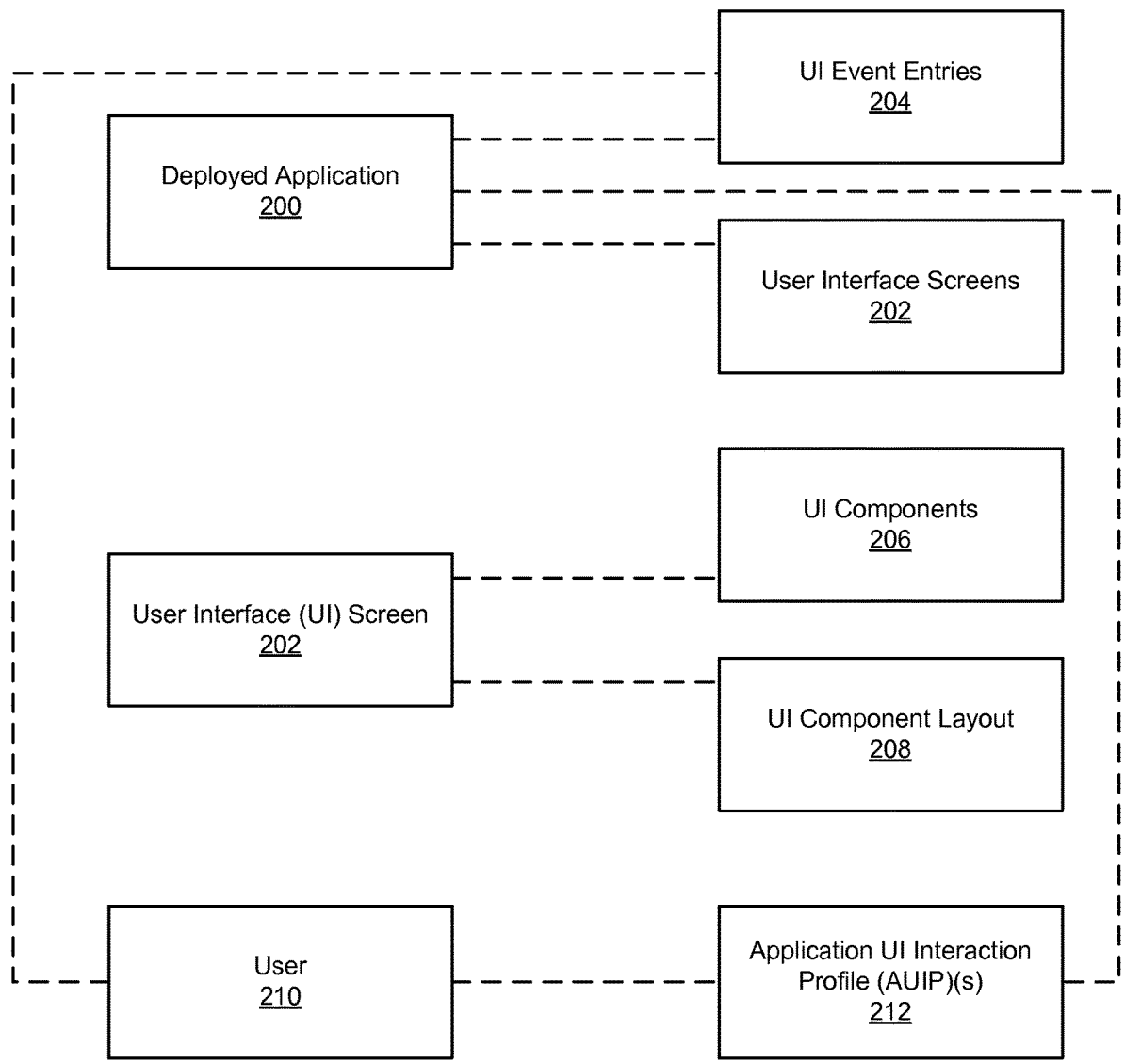
FIG. 2 shows the relationship between various components in the example system in accordance with one or more embodiment of the disclosed technology.

FIG. 2 shows various components of the technology and the relationship between various components in the example system in accordance with one or more embodiment of the disclosed technology.

In one embodiment of the technology, each deployed application (200) (described above) is associated with (or includes) one or more UI screens (or webpages) (202). Each of the UI interface screens (202) may include one or more UI components (206) organized according to a UI component layout (208). Examples of UI components (206) may include, but are not limited to, checkboxes, buttons, radio buttons, sliders, numeric updown buttons, search boxes, scroll bars, list boxes, text boxes, menus, and icons (i.e., a picture that represents objects such as a file, program, web page, or command). The UI component layout (208) specifies how the UI components on the particular UI screen are arranged.

As discussed above, the application server (100) includes functionality to create and store UI event entries (204). Each UI event entry may be associated with one or more of the following: (i) a deployed application (i.e., the application in which the UI event was initiated) and (ii) the user that initiated/triggered the UI event.

Each UI event entry may specify (204) one or more of the following: (i) name of the UI event that was performed (e.g., button A was clicked, UI component B was selected, a menu selection event (i.e. a particular item in a menu is selected), a webpage transition event (i.e., an event that results in the transition to a new UI screen), etc.), (ii) the application in which the UI event was performed, (iii) a UI screen in which the UI event was initiated; (iv) the username of the user that performed the UI event; (v) the role of the user that performed the UI event; (vi) any other information about the user that performed the event; (vii) a timestamp of when the UI event was initiated; (viii) a workflow group with which the event is associated (described below), (ix) any other context information associated with the UI event; and/or (x) any other information that is associated with the UI event.

In one embodiment of the technology, the context information for the UI event may include information about the state of the application and/or information about the user at the time the UI event was initiated. For example, if application is designed to assist the user in performing a series of tasks (also referred to as workflows), then if the user triggers a UI event while performing a portion of a workflow such context information may be included in the UI event entry.

In another example, the UI event entry may include context information in the form of the geographic location in which the user is located when the user triggered the UI event. For example, the UI entry event may indicate that the user was in geographic location A when the UI event specified in the UI entry was triggered. The context information may be used, for example, to enable a more fine grained modification of the UI screen for a given user when the user is traveling to different geographic locations. For example, a first modified UI screen may be shown to the user when the user is geographic location A and a second modified UI screen may be shown to the user when the user is in geographic location B.

Continuing with the discussion of FIG. 2, the individual UI event entries may be analyzed in order to generate an application UI interaction profile (AUIP). The AUIP (212) includes information that is aggregated from the individual UI event entries. For example, the AUIP may indicate that user A spends 70% of her time on UI screen C of a deployed application, where this information may be ascertained based on the number of UI event that are triggered on UI screen C. The AUIP (212) may also include information about the most common UI events that are performed on a given UI screen and/or within the deployed application as a whole. The AUIP (212) may include other information without departing from the technology (see e.g., FIGS. 5A-7C).

In one embodiment of the technology, each user (210) is associated with one AUIP for each application that she uses. Alternatively, each user (210) may be associated with a single AUIP for all deployed applications that the user is using. Further, each deployed application may be associated with one or more AUIPs, where the AUIPs may be associated with specific users and/or with groups of users (e.g., users with the same role).

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

Figure 3:
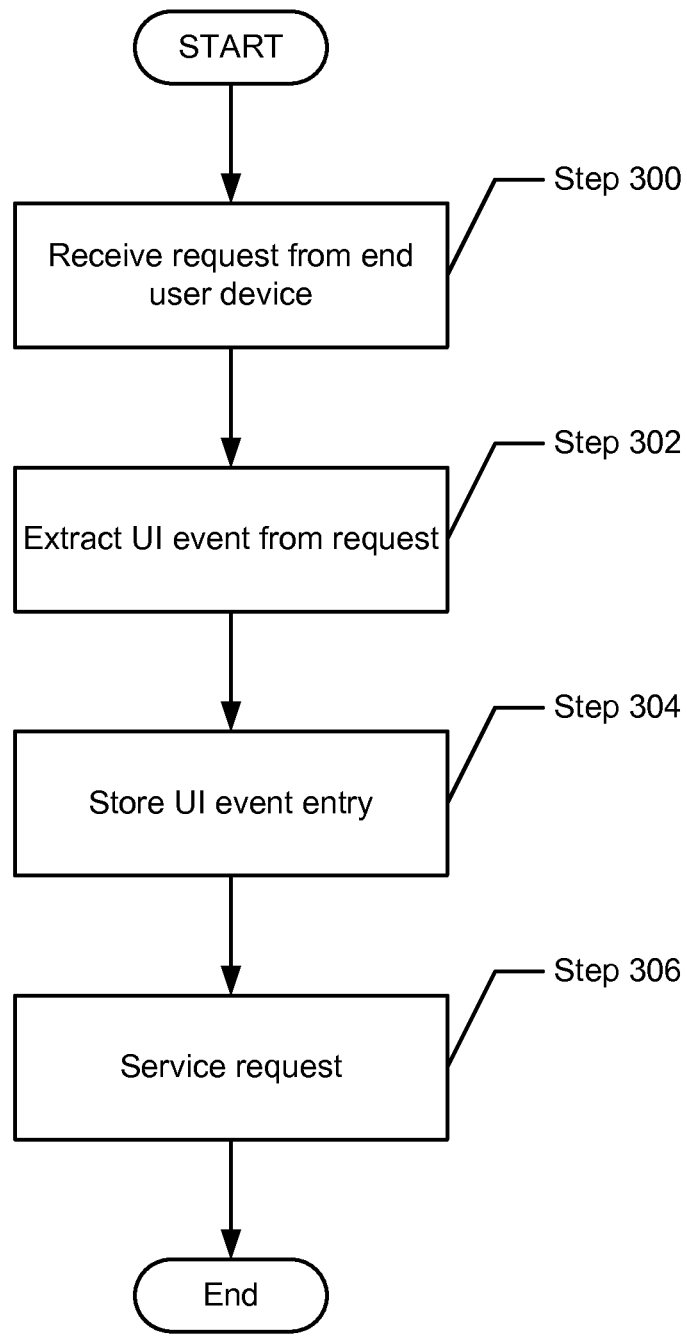
FIG. 3 shows an example method for tracking user interface (UI) events in accordance with one or more embodiments of the disclosed technology.

FIG. 3 shows an example method for tracking user interface (UI) events in accordance with one or more embodiments of the disclosed technology.

In step 300, a request is received from an end user device. The request may correspond to any request that was initiated based on a user performing a UI event (e.g., clicking on a UI component) on a UI screen within the application. The request may include information about UI event that resulted in the request being generated and sent to the application server. The request may also include various parameters (or values) that need to be processed by the deployed application in order to service the request.

In step 302, information about the UI event associated with the request in step 300 is extracted (or otherwise obtained) from the request.

In step 304, a UI event entry (discussed above) is created and stored in the UI analytics repository. The UI event entry may be created by the UI analytics engine. The information specified in the UI event entry may vary based on the implementation of the technology.

In step 306, the requested is serviced. More specifically, the request is processed by the deployed application and a response is provided by the deployed application to the end user device (which, in various embodiments, may be referred to as a requesting entity).

In one embodiment of the technology, servicing the request may include obtaining content and then providing the obtained content to the end user device. In various embodiments of the technology, servicing the request may also include provide another UI screen (or webpage) for the end user device to display. In such cases, servicing the request may include performing steps 402-408 (described below).

In one or more embodiments of the technology, UI event entries created and stored for all (or a portion) of the requests are processed by the application server or, more specifically, the UI analytics engine. The UI analytics engine (as discussed above) uses this information to generate AUIPs (described above). The UI analytics engine also includes functionality to update the previously generated AUIPs and/or to create new AUIPs based on new UI event entries that are created and stored in the UI analytics repository.

Figure 4:
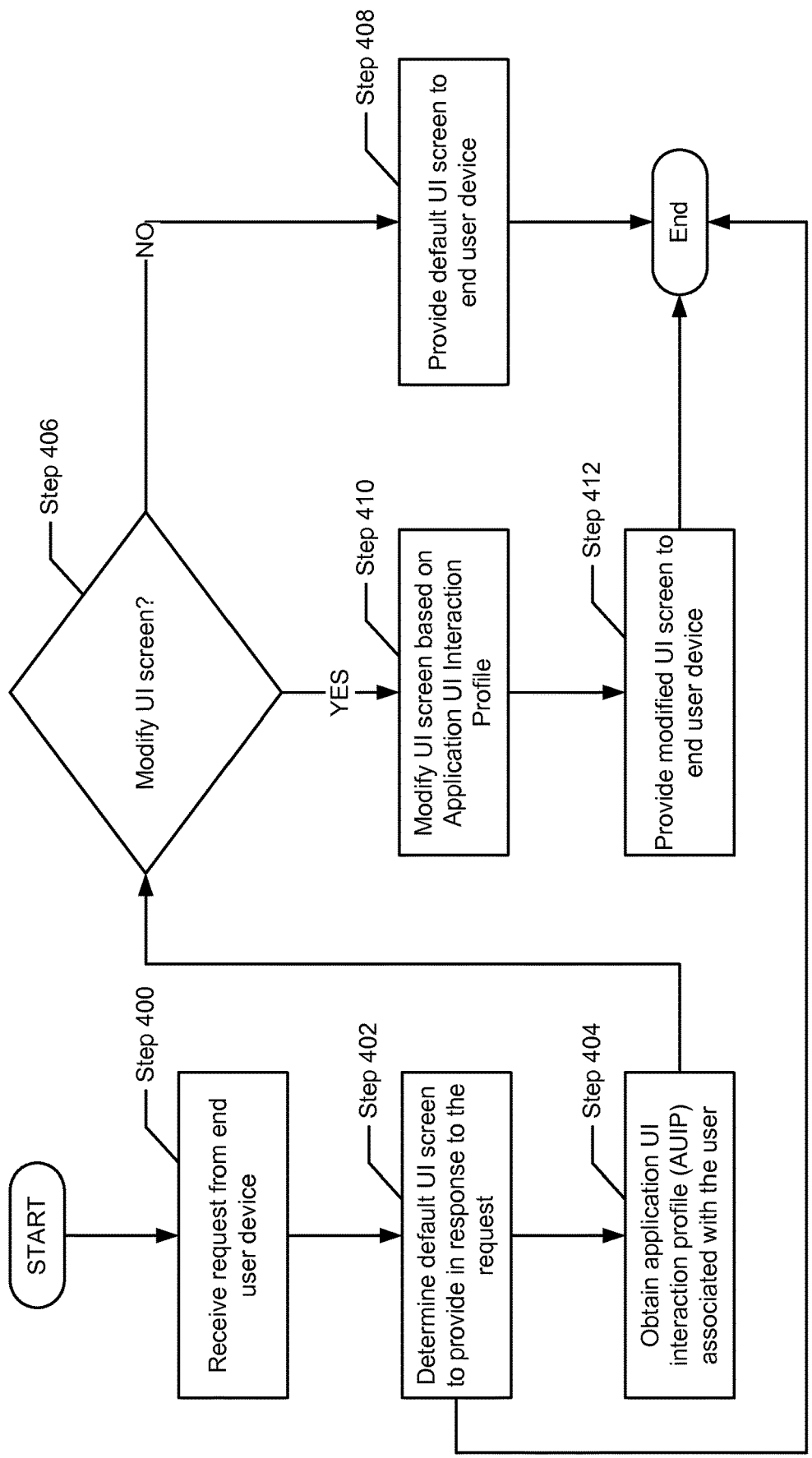
FIG. 4 shows an example method for implementing dynamic and/or adaptive user interfaces in accordance with one or more embodiments of the disclosed technology.

FIG. 4 shows an example method for implementing dynamic and/or adaptive user interfaces in accordance with one or more embodiments of the disclosed technology.

In step 400, a request is received from an end user device. The request may correspond to any request that was initiated based on a user performing a UI event (e.g., clicking on a UI component) on a UI screen within the application. The request may include information about UI event that resulting in the request being generated and sent to the application server. The request may also include various parameters (or values) that need to be processed by the deployed application in order to service the request.

In step 402, the deployed application may determine a default UI screen that is to be provided to end user device in response to the request. More specifically, step 402 may include processing the request in order, for example, to determine the nature of the response that is to be provided to the end user device.

In some scenarios, the request does not result in a change to the UI screen that is currently being shown to the user via the end user device. In such scenarios, the response, which may include, for example, content that is to be displayed in the UI screen that is currently being shown to the user is obtained by the deployed application and then provided to the end user device and the process ends.

In other scenarios, the request results in a change in the UI screen, i.e., the response to the request requires that the end user device display another UI screen to the user. Examples of such requests may include, but are not limited to: (i) logging into an application that results in the home screen being shown; (ii) selecting a menu element that results in a new UI screen associated with the selected menu element being shown; (iii) selecting a UI component on a current UI screen which triggers an action (e.g., a search action, a file upload action, etc.) that results in a new UI screen that displays the result of performing the action that was triggered.

In these scenarios, the request is processed and, as part of the processing, the new UI screen that is to be shown to the user is obtained. In certain embodiments the UI screen identified in step 402 is referred to as the default UI screen, i.e., UI screen that was originally created by the application developer.

In step 404, one or more AUIPs associated with the user are obtained. The AUIPs may be, for example, (i) specific to the user; (ii) specific to a role of the user (e.g., human resources employee, regional sales manager, etc.); and/or (iii) specific to the legal entity with which the user is associated (e.g., a company, corporation, partnership, etc.). Further, the AUIP may (or may not be) application specific. For example, the AUIPs obtained in step 404 may be specific to the application. Alternatively, the AUIPs may include both application-specific and non-application specific AUIPs.

In step 406, a determination is made about whether the UI screen (i.e., the UI screen obtained in step 406) is to be modified. Said another way, the AUIP(s) obtained in step 404 is analyzed to determine whether the UI should be modified. The determination in step 406 may include: (i) determining whether the AUIP(s) includes any information related to how the user has previously interacted with the UI components on the UI screen identified in step 402 and/or (ii) determining whether the AUIP includes any information about how the user has previously interacted with the application (i.e., the application with which the UI screen is associated).

If there is no information available in the AUIP(s) to make such a determination, then the UI analytics engine may take no further action and allow the process to proceed to step 408. In step 408, the default UI screen (along with the appropriate content) is provided to the end user device. The process then ends.

Returning to step 406, if there is relevant information in the AUIP that is available then the UI analytics engine proceeds to step 410. In step 410, the UI screen is modified based on the AUIP. Modification of the UI screen may include, for example, (i) modifying a UI component and/or UI component layout of UI components on the UI screen (see e.g., FIGS. 5A-5C); (ii) adding and/or removing UI components from a UI screen (see e.g., FIG. 6A-6B); and (iii) adding and/or removing content that is to be displayed in the UI screen (see e.g., FIG. 7A-7C). Other modifications to the UI screen may be performed without departing from the technology. In step 412, modified UI screen (along with the appropriate content) is provided to the end user device. The process then ends.

In one embodiment, as discussed in FIG. 4, the modification of UI screens is performed in real-time (i.e., in response the requests from the end user device).

In another embodiment, the UI analytics engine analyzes the UI event entries and determines how various UI screens should be modified and/or how each of the various UI screens should be connected. Based on this analysis, one or more of the following UI screen modifications may occur: (i) a new UI screen is created that incorporates content (and/or UI components) from two or more other default UI screens; (ii) one or more default UI screens are removed from the deployed application; (iii) the order in which a user may navigate through one or more UI screens is updated; (iv) one or more UI screens is modified as described above with respect to FIG. 410. In one embodiment of the technology, the modified UI screens may be stored in the application server. Further, for any given application, there may be multiple versions of a given UI screen, where each version of the UI screen is modified based on an AUIP associated with a specific user of the application and/or modified based on an AUIP associated with a specific set of users (e.g., users associated with a given role, users located within a given geographic regions, etc.) of the application.

The resulting modified UI screens may then be retrieved and provided to the appropriate user(s) in response to received requests. In this manner, the modifications to UI may be performed at some point prior to the request based on a previously obtained AUIP(s) for the user. Accordingly, when a request is received by an end user device (see e.g., FIG. 4, step 400), the application and user are identified and, based this information, the previously generated modified UI screen is obtained and presented to the user (populated with appropriate content).

The following section describes various examples in accordance with one or more embodiments of the technology. The examples are not intended to limit the scope of the technology.

FIGS. 5A-5C show an example of dynamically modifying UI components in accordance with one or more embodiments of the disclosed technology. The example is not intended to limit the scope of the disclosed technology.

Turning to FIG. 5A, consider a scenario in which a UI screen (not shown) includes a menu that includes a set of menu elements denoted A-D and X-Z, where menu elements A-D are visible in the menu and menu elements X-Z are not visible in the menu; rather, menu elements X-Z can only be accessed by selecting a button (not shown) to further expand the menu to show menu elements X-Z. For the purposes of this example assume that the user, as evidenced by multiple UI event entries, only ever selects menu elements A, X, C, and Z.

Accordingly, the UI analytics engine, based on the above UI event entries, may update the menu, as shown in FIG. 5B, such that menu elements A, X, C, and Z are visible and menu elements B, Y and Z are not visible in the menu.

With respect to FIG. 5C, further assume that a second user also uses the same application; however, the second user only uses menu elements A, X, Y, and Z. Accordingly, for the second user, the UI analytics engine may update the menu, as shown in FIG. 5C, such that menu elements A, X, Y, and Z are visible and menu elements B, C and D are not visible in the menu.

Figure 6A:
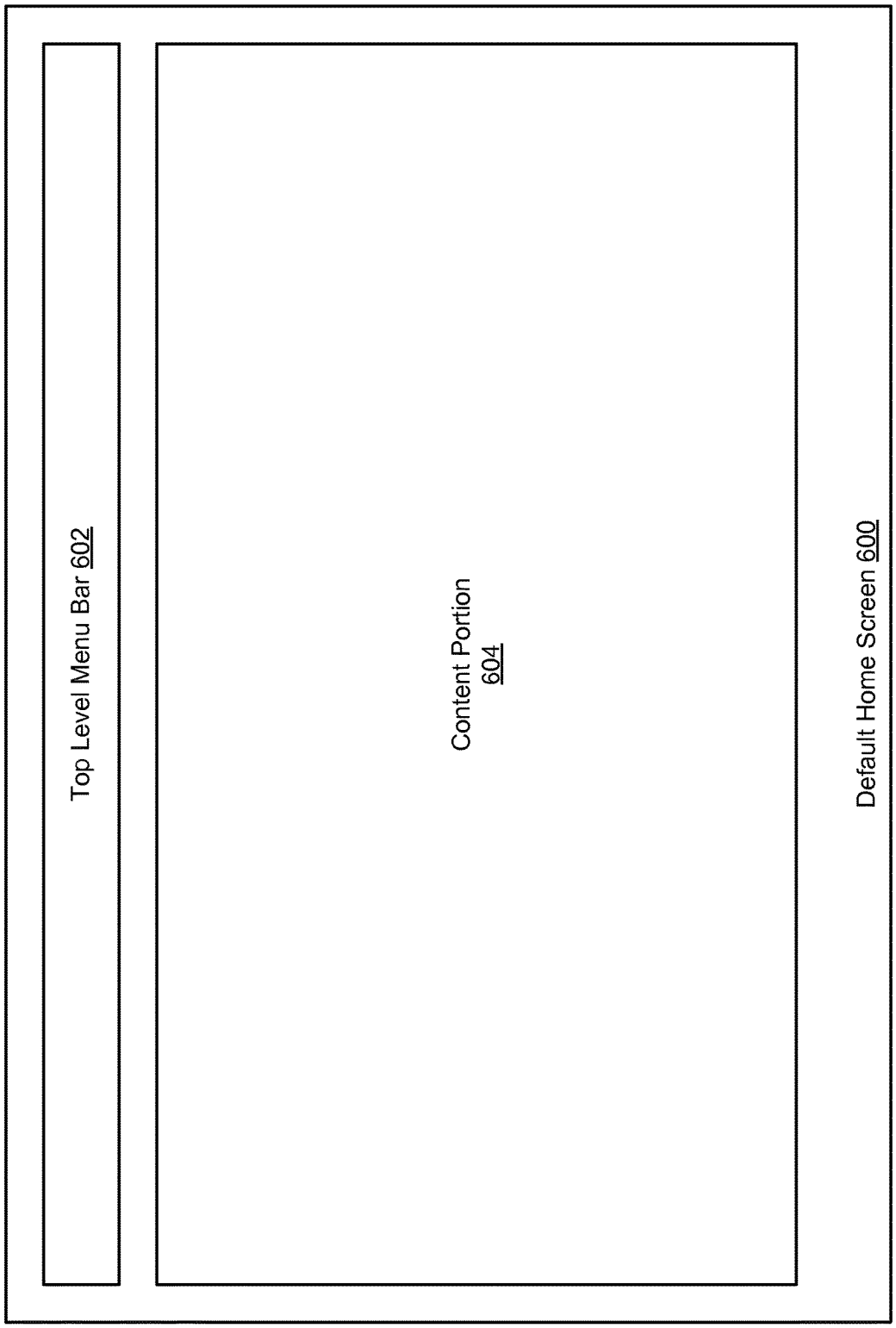
FIGS. 6A and 6B show an example of dynamically modifying a UI screen in accordance with one or more embodiments of the disclosed technology.
Figure 6B:
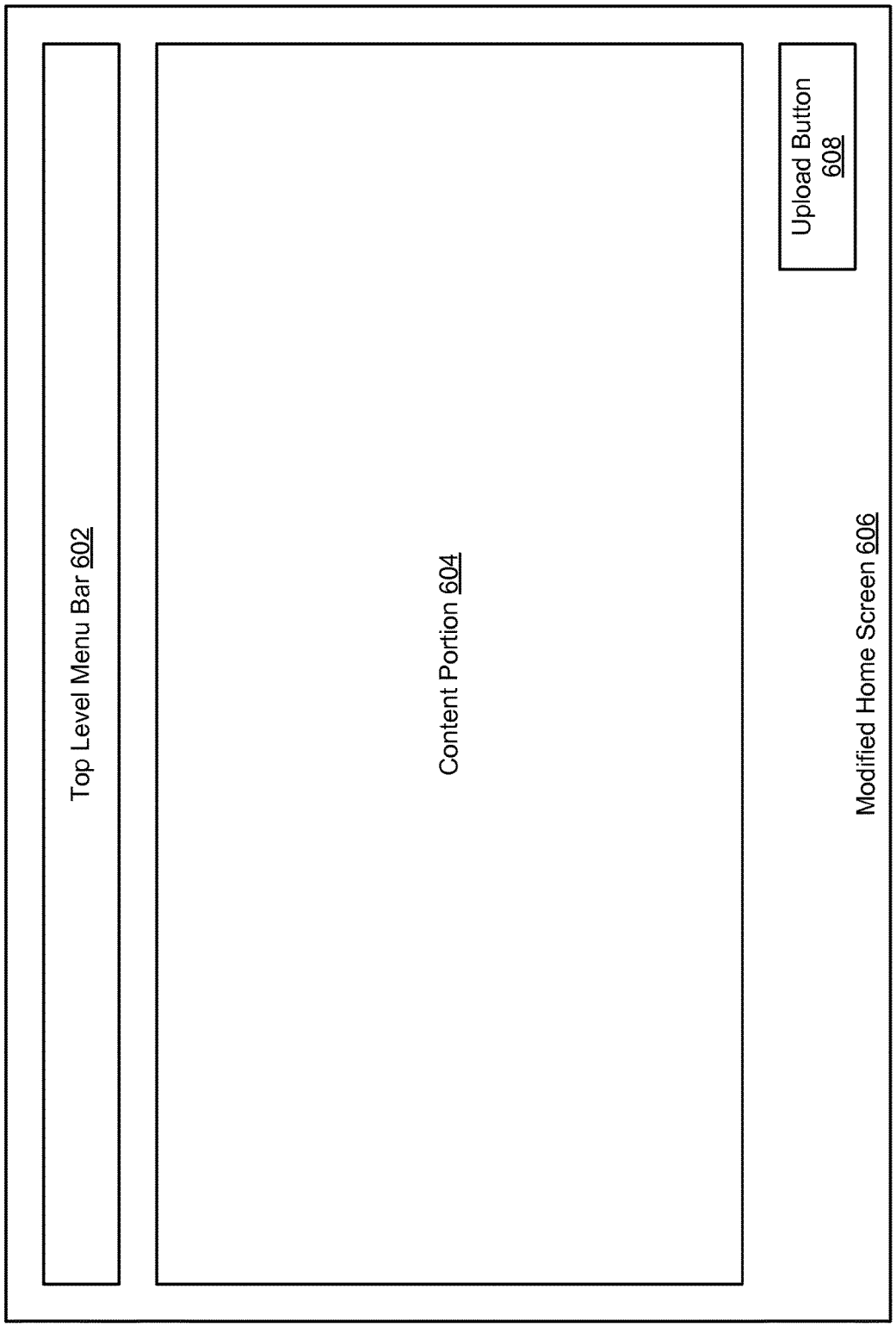

FIGS. 6A-6B show an example of dynamically modifying a UI screen in accordance with one or more embodiments of the disclosed technology. The example is not intended to limit the scope of the disclosed technology.

Turning to FIG. 6A, consider a scenario in which the application includes a default home screen (600) as one of the UI screens in the application. The default home screen (600) includes a top level menu bar (602) and a content portion (604).

For the purposes of this example assume that the user, as evidenced by multiple UI event entries, routinely performs a file upload action and that the file upload action in the application is located on the third UI screen (shown). Accordingly, to access the file upload action, the user needs to select a first button in a home screen to navigate to a second UI screen and then select a second button on the second UI screen to navigate to the third UI screen. Once the third UI screen is displayed, the user may initiate the file upload action by selecting a corresponding UI component on the third UI screen.

Referring to FIG. 6B, the UI analytics engine, based on the above UI event entries, may modify the home screen UI (600) in order to generate a modified home screen (606) that includes a new UI component (608) that enables a user to directly initiate the upload action from the modified home screen (606). In this manner, embodiments of the technology enable the user to more efficiently perform the upload action (i.e., in one click from the modified home screen as opposed to three clicks from the default home screen).

Figure 7A:
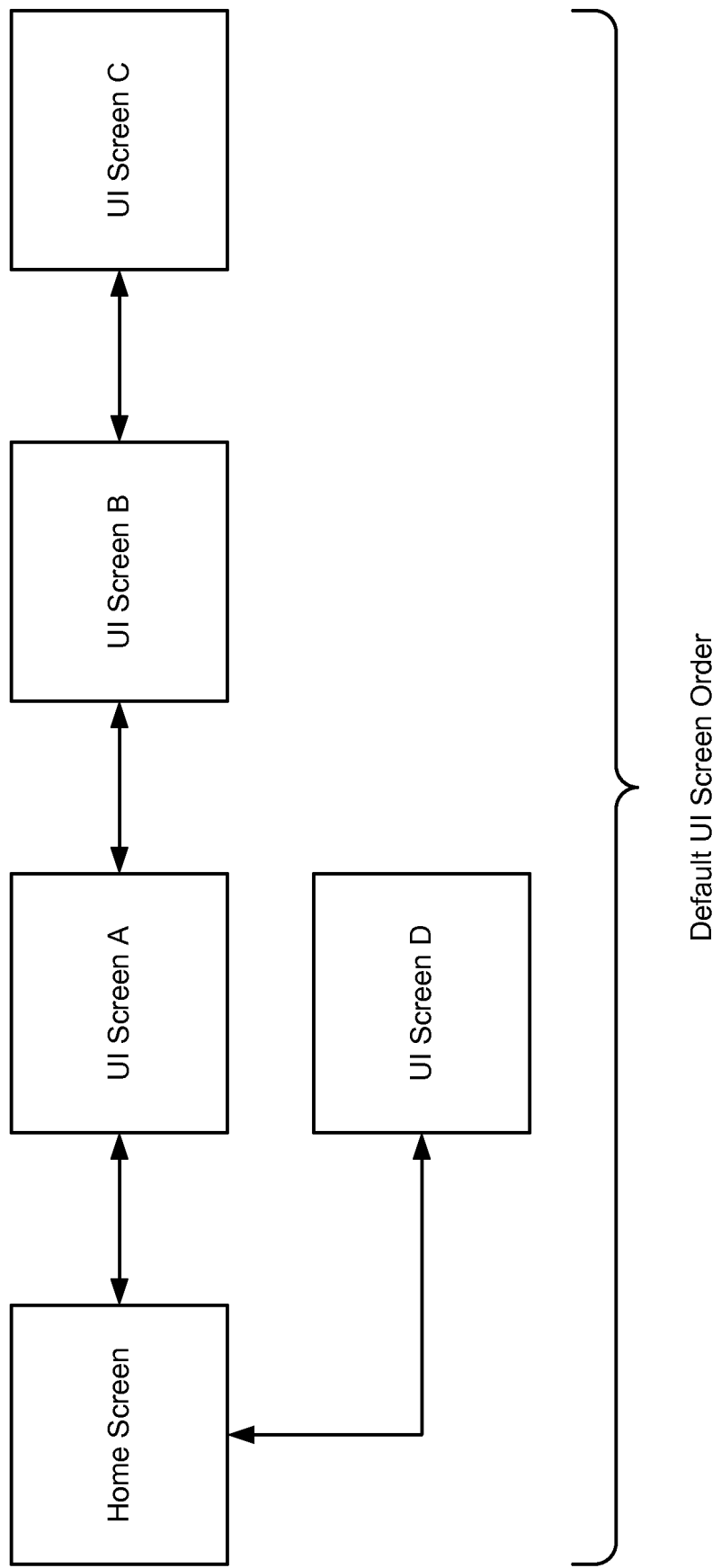
FIGS. 7A, 7B, and 7C show an example of dynamically modifying UI screens and the order of UI screens in accordance with one or more embodiments of the disclosed technology.
Figure 7B:
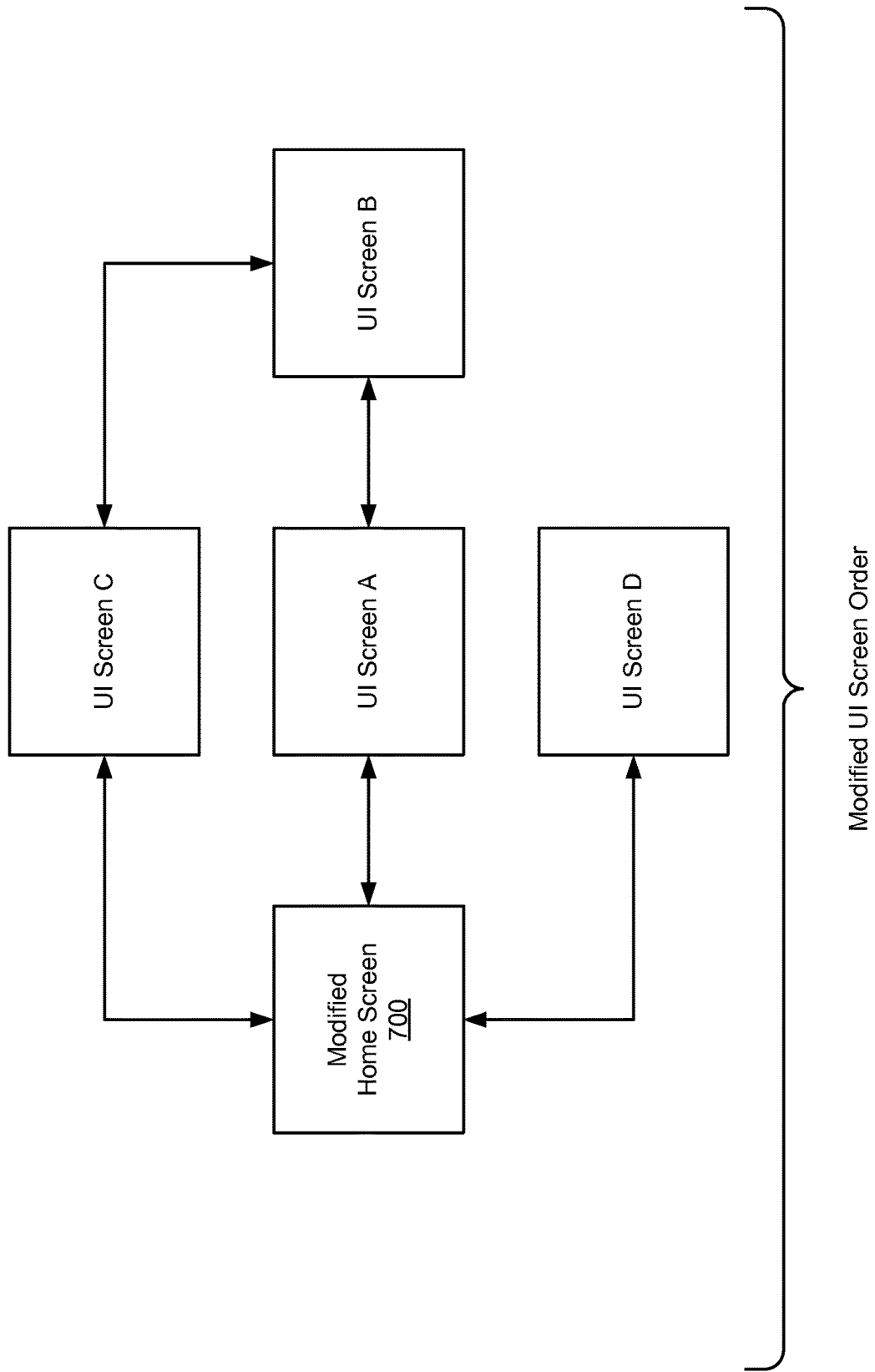
Figure 7C:
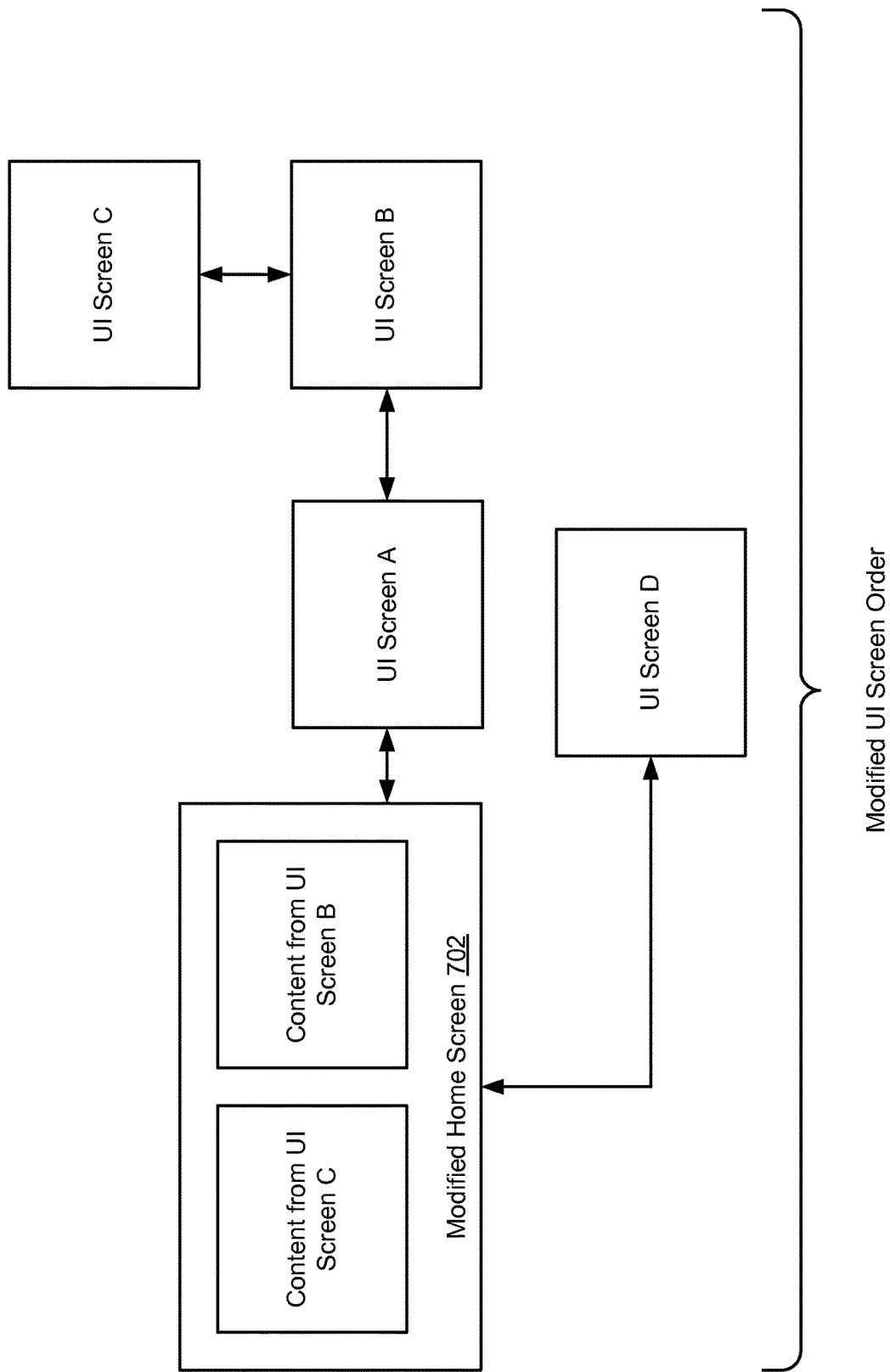

FIGS. 7A-7C show an example of dynamically modifying UI screens and the order of UI screens in accordance with one or more embodiments of the disclosed technology. The example is not intended to limit the scope of the disclosed technology.

Consider a scenario in which the default UI screen order for an application is shown in FIG. 7A. More specifically, from the home screen the user may either navigate to UI screen A or UI screen D. Further, from UI screen A the user may navigate to UI screen B and from UI screen B the user may navigate to UI screen C. The user, using the default UI screen order, may not directly navigate to UI screen C from the home screen; rather, the user must navigate at least through UI screen A and UI screen B prior to reaching UI screen B.

For the purposes of this example assume that the user, as evidenced by multiple UI event entries, spends 70% of their time on UI screen C. Accordingly, as shown in FIG. 7B, the UI analytics engine may: modify and/or add one or more UI components (not shown) on the home screen in order to generate a modified home screen (700). The modified home screen may allow direct access to UI screen C from the modified home screen (700).

With respect to FIG. 7C, consider a scenario in which the user uses content that is displayed in various UI components (not shown) in UI screen B and UI screen C. More specifically, assume that the user is a regional sales representative and the application includes the following information: (i) contact information for each client in the user's sales territory on UI screen B and (ii) a summary of sales made to each client on UI screen C. Further, based on the analysis of the UI event entries, the UI analytics engine determines that the user spends a majority of her time switching between UI screen B and UI screen C.

Accordingly, the UI analytics engine generates a modified home screen (702), as shown in FIG. 7C, that includes content from UI Screen B and content from UI screen C. Further, the modified home screen (702) may be updated to include a dashboard component (not shown) that includes the content from UI screen B and content from UI screen C. In this manner, embodiments of the technology enable the aggregation of content that is relevant to a user onto a single UI screen.

Figure 8:
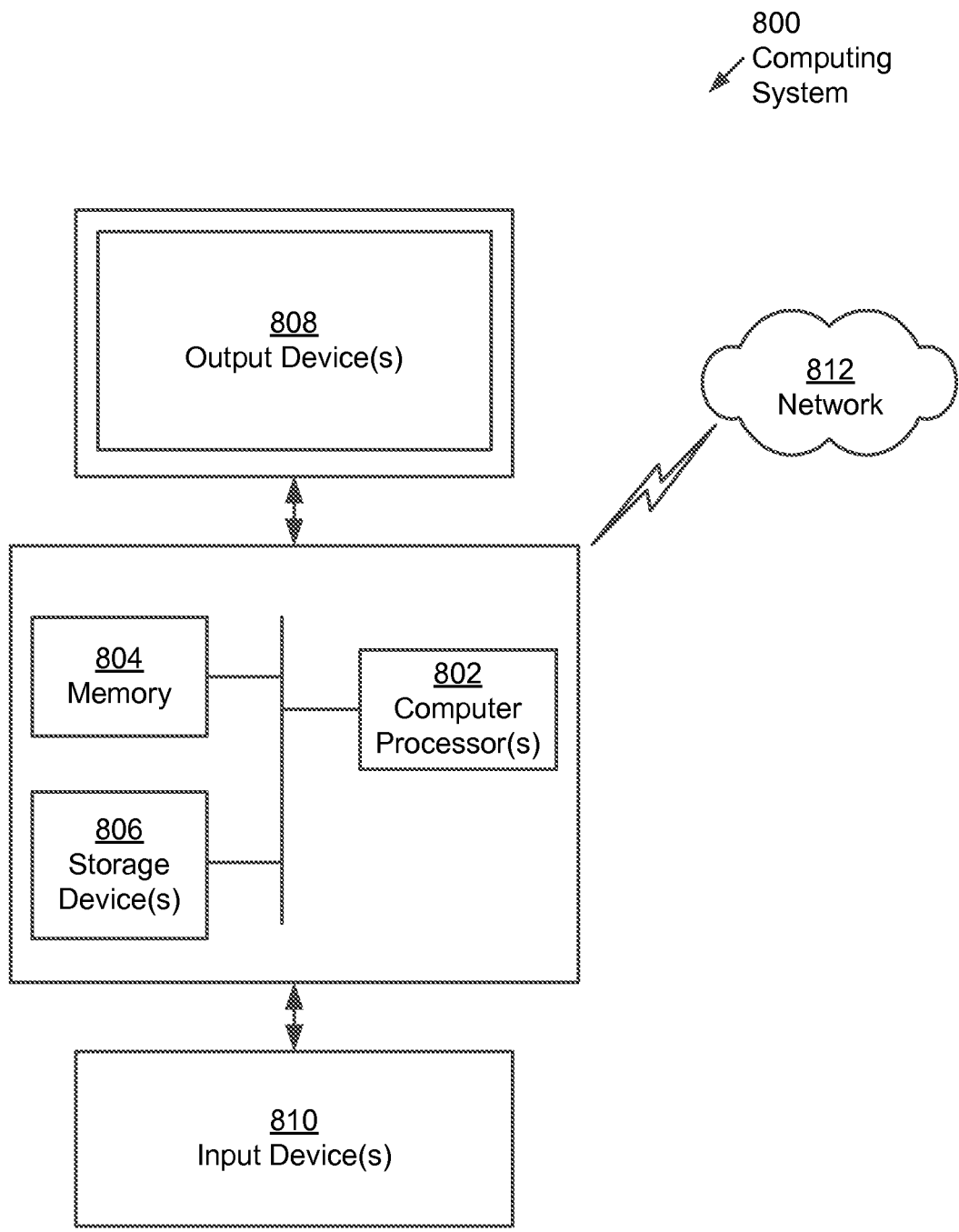
FIG. 8 shows a computing system in accordance with one or more embodiments of the disclosed technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s)

(806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the disclosed technology has been described with respect to a limited number of embodiments, those skilled in the art, having benefit of this disclosure, will appreciate that other embodiments can be devised which do not depart from the scope of the disclosed technology as disclosed herein. Accordingly, the scope of the disclosed technology should be limited only by the attached claims.

What is claimed is:

1. A method for adaptively modifying a user interface, the method comprising:
receiving a first plurality of requests at an application server hosting a plurality of deployed applications, the requests in the first plurality of requests initiated based on a user performing user interface (UI) events on UI screens within the deployed applications, each request comprising information about a respective UI event that resulted in that request being generated and parameters to be used by a respective deployed application to service that request;
for each request of the first plurality of requests:
extracting, from the request, the information about the respective UI event that resulted in that request being generated;
creating a UI event entry for the respective UI event to store the information about the respective UI event in a repository of UI event entries, the UI event entry including a name of the respective UI event that was performed, an identifier of the user that performed the respective UI event, an indication of a specific set of users to which the user belongs, an indication of the respective deployed application in which the respective UI event was performed, and an indication of a respective UI screen in which the respective UI event was initiated;
generating a plurality of application-specific application user interface interaction profiles (AUIPs), wherein generating the plurality of application-specific AUIPs comprises generating, for each of the plurality of deployed applications, an application-specific application user interface interaction profile (AUIP), wherein generating the application-specific AUIP for each of the plurality of deployed applications comprises:
selecting UI event entries associated with the specific set of users and that deployed application; and
determining an interaction metric aggregated from the selected UI event entries, wherein the application-specific AUIP generated for each of the plurality of deployed applications is specific to that deployed application and the specific set of users;
receiving, from a client device, a first request to a first deployed application from the plurality of deployed applications, the first request identifying the specific set of users;
determining a first default UI screen to return to the client device in response to the first request; and
determining that the first request is associated with the user and the specific set of users;
accessing the application-specific AUIP associated with the first deployed application and the specific set of users to determine the interaction metric;
based on the interaction metric, determining that the first default UI screen should be modified and modifying the first default UI screen to generate a first modified UI screen; and
serving the first modified UI screen to the client device responsive to the first request.

2. The method of claim 1, wherein the specific set of users is defined by a user role, and wherein the application-specific AUIP associated with the first deployed application and the specific set of users is a role-specific AUIP based on an aggregation of UI event entries containing the user role, the aggregation of UI event entries containing the user role comprising UI event entries associated with a plurality of users.

3. The method of claim 2, further comprising:
receiving a second request to the first deployed application from the client device;
determining a second default UI screen to return to the client device in response to the second request;
determining that the second request is associated with the user role;
accessing the role-specific AUIP to determine that the second default UI screen should be modified and modifying the second default UI screen to generate a second modified UI screen; and
serving the second modified UI screen to the client device responsive to the second request.

4. The method of claim 1, further comprising:
determining, for at least one request of the first plurality of requests, a context associated with the respective UI event that resulted in that request being generated, wherein creating the UI event entry for the respective UI event comprises specifying the context associated with the respective UI event.

5. The method of claim 4, wherein the context associated with the respective UI event comprises a state of the respective deployed application at a time the respective UI event was initiated.

6. The method of claim 1, wherein the first modified UI screen comprises a UI component not present in the first default UI screen.

7. The method of claim 1, wherein the first modified UI screen comprises a different UI component layout than the first default UI screen.

8. The method of claim 1, wherein the UI events comprises a menu selection event.

9. The method of claim 1, wherein the UI events comprise a webpage transition event.

10. The method of claim 1, wherein the UI events comprise a button click event.

11. A computer program product comprising a non-transitory computer readable medium storing computer readable program code executable by a processor to:
   receive a first plurality of requests at an application server hosting a plurality of deployed applications, the requests in the first plurality of requests initiated based on a user performing user interface (UI) events on UI screens within the deployed applications, each request comprising information about a respective UI event that resulted in that request being generated and parameters to be used by a respective deployed application to service that request;
   for each request of the first plurality of requests:
      extract, from the request the information about the respective UI event that resulted in that request being generated;
      create a UI event entry for the respective UI event to store the information about the respective UI event in a repository of UI event entries, the UI event entry including a name of the respective UI event that was performed, an identifier of the user that performed the respective UI event, an indication of a specific set of users to which the user belongs, an indication of the respective deployed application in which the respective UI event was performed, and an indication of a respective UI screen in which the respective UI event was initiated;
   generate, for each of the plurality of deployed applications, an application-specific application user interface interaction profile (AUIP), wherein generating the application-specific AUIP for each of the deployed applications comprises:
      selecting UI event entries associated with the specific set of users and that deployed application; and
      determining an interaction metric aggregated from the selected UI event en tries, wherein the application-specific AUIP is specific to that deployed application and to the specific set of users;
   receive, from a client device, a first request to a first deployed application from the plurality of deployed applications, the first request identifying the specific set of users;
   determine a first default UI screen to return to the client device in response to the first request;
   determine that the first request is associated with the user and the specific set of users;
   access the application-specific AUIP associated with the first deployed application and the specific set of users to determine the interaction metric;
   based on the interaction metric, determine that the first default UI screen should be modified and modify the first default UI screen to generate a first modified UI screen; and
   serve the first modified UI screen to the client device responsive to the first request.

12. The computer program product of claim 11, the specific set of users is defined by a user role and the application-specific AUIP associated with the first deployed application is a role-specific AUIP based on an aggregation of UI event entries containing the user role, the aggregation of UI event entries containing the user role comprising UI event entries associated with a plurality of users.

13. The computer program product of claim 12, wherein the computer readable program code is further executable to:
   determine a second default UI screen to return to the client device in response to a second request from the client device;
   determine that the second request is associated with the user role;
   access the role-specific AUIP to determine that the second default UI screen should be modified and modifying the second default UI screen to generate a second modified UI screen; and
   serve the second modified UI screen to the client device responsive to the second request.

14. The computer program product of claim 11, wherein the computer readable program code is further executable to:
   determine, for at least one request of the first plurality of requests, a context associated with the respective UI event that resulted in that request being gene rated, wherein creating the UI event entry for the respective UI event comprises specifying the context associated with the respective UI event.

15. The computer program product of claim 14, wherein the context associated with the respective UI event comprises a state of the respective deployed application at a time the respective UI event was initiated.

16. The computer program product of claim 11, wherein the first modified UI screen comprises a UI component not present in the first default UI screen.

17. The computer program product of claim 11, wherein the first modified UI screen comprises a different UI component layout than the first default UI screen.

18. The computer program product of claim 11, wherein the UI events comprise a menu selection event.

19. The computer program product of claim 11, wherein the UI events comprise a webpage transition event.

20. The computer program product of claim 11, wherein the UI events comprise a button click event.

21. A system for providing an adaptive interface, the system comprising:
   a persistent data store;
   an application server coupled to the persistent data store, the application server comprising:
      a deployed application including one or more user interface (UI) screens, the one or more UI screens including a default UI screen, each of the one or more UI screens including one or more UI components and a component layout that specifies how the one or more UI components of that UI screen are arranged; and
      a UI analytics engine;
      wherein the deployed application is executable to:
         receive a first plurality of requests from a plurality of client computers, the first plurality of requests comprising requests initiated by a first plurality of users performing UI events on the one or more UI screens within the deployed application;
         service the first plurality of requests;
         provide the first plurality of requests to the UI analytics engine;
         receive a subsequent request after the first plurality of requests, the subsequent request received from a first client computer and associated with a first user from the first plurality of users;
         determine that the default UI screen corresponds to the subsequent request; and in response to the subsequent request, return a responsive UI screen as determined by the UI analytics engine to the first client computer; and wherein the UI analytics engine is executable to:
receive the first plurality of requests from the deployed application;

create a plurality of UI event entries based on the first plurality of requests and store the plurality of UI event entries in the persistent data store, each UI event entry of the plurality of UI event entries created from a respective request from the first plurality of requests, each UI event entry of the plurality of UI event entries including:
  a name of a respective UI event that initiated the respective request;
  the deployed application in which the respective UI event included in that UI event entry was performed;
  a UI screen from the one or more UI screens in which the respective UI event included in that UI event entry was initiated;
  an identifier for an initiating user from the first plurality of users who performed the respective UI event included in that UI event entry;
  an indication of a specific set of users of which the initiating user identified in that event entry belongs; and
  a timestamp of when the respective UI event in that UI event entry was performed;

generate a plurality of application-specific application user interface interaction profiles (AUIPs) from the plurality of UI event entries, wherein generating the plurality of application-specific AUIPs comprises:
  generating a first application-specific application user interface interaction profile (AUIP) for a first specific set of users from the first plurality of users, wherein generating the first application-specific AUIP comprises:
    selecting a first subset of UI event entries from the plurality of UI event entries, each UI event entry in the first subset of UI event entries associated with both the first specific set of users and the deployed application; and
    determining information related to how the first specific set of users interacted with the one or more UI components of the default UI screen, the information related to how the first specific set of users interacted with the one or more UI components of the default UI screen comprising a first interaction metric aggregated from the first subset of UI event entries; and
  generating a second application-specific AUIP for a second specific set of users from the first plurality of users, wherein generating the second application-specific AUIP comprises:
    selecting a second subset of UI event entries from the plurality of UI event entries, each UI event entry in the second subset of UI event entries associated with both the second specific set of users and the deployed application;
    determining information related to how the second specific set of users interacted with the one or more UI components of the default UI screen, the information related to how the second specific set of users interacted with the one or more UI components of the default UI screen comprising a second interaction metric aggregated from the second subset of UI event entries;

based on a determination that the first user is not associated with any of the plurality of application-specific AUIPs, indicate to the deployed application to return the default UI screen as the responsive UI screen for the subsequent request; and based on a determination that the first user is a member of the first specific set of users:
  modify at least one component of the default UI screen or the component layout of the default UI screen based on the first interaction metric to create a first modified UI screen; and
  cause the deployed application to return the first modified UI screen as the responsive UI screen for the subsequent request.

* * * * *